March 9, 1954      B. J. CHROMY      2,671,845
RAPIDLY HEATING ELECTRIC SOLDERING TOOL
Filed April 18, 1950      2 Sheets-Sheet 1

INVENTOR

Ben. J. Chromy.

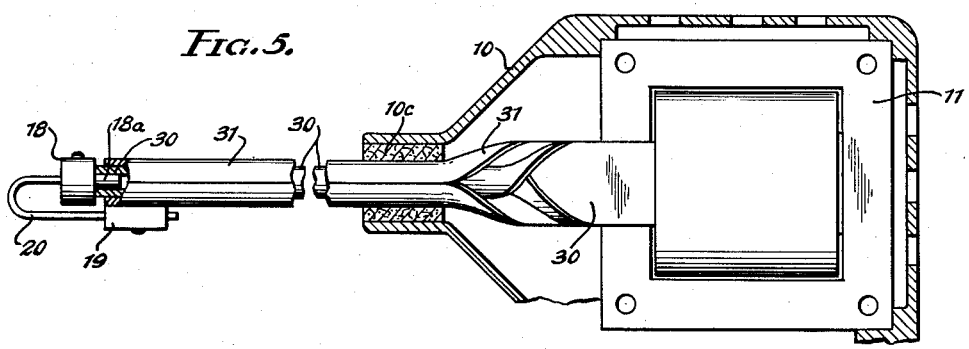
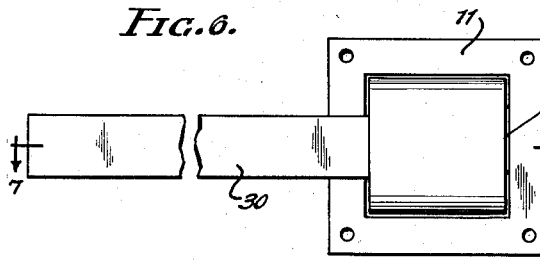
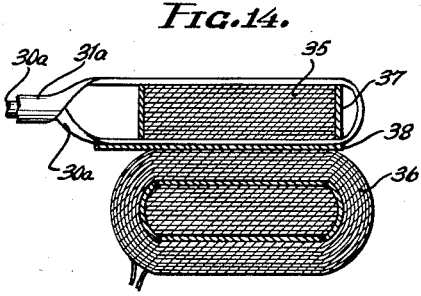
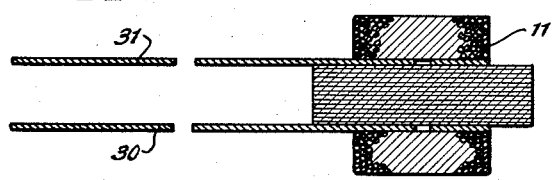
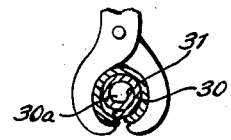
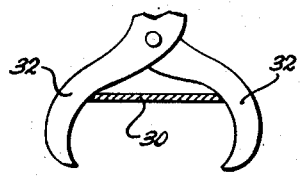
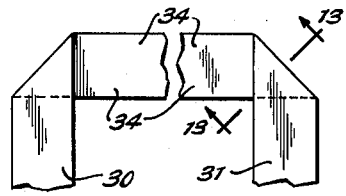
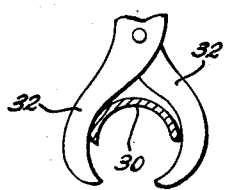

Patented Mar. 9, 1954

2,671,845

UNITED STATES PATENT OFFICE 2,671,845

RAPIDLY HEATING ELECTRIC SOLDERING TOOL

Benjamin J. Chromy, Washington, D. C.

Application April 18, 1950, Serial No. 156,518

13 Claims. (Cl. 219—26)

1

This invention relates to electric soldering tools of the portable and substantially instantaneously heated type.

An object of this invention is to provide an improved soldering tool of the type disclosed in French Patent No. 787,065, dated June 24, 1935, and U. S. Patent No. 2,405,866.

Another object of this invention is to provide an improved soldering tool with a substantially rigid co-axial current feeding arrangement for supplying high intensity currents to a heating tip made up of a short length of wire of small cross section.

Another object of this invention is to provide an electric soldering tool of increased efficiency in which the heated soldering element consists of a short length of wire rigidly clamped at the working end of a co-axial support.

Still another object of this invention is to provide a soldering tool with a small stepdown transformer having a secondary wound with relatively wide copper strip, the ends of which are shaped into co-axial tubular conductors having the heated soldering tip rigidly attached thereto.

Other and further objects of this invention will be apparent to those skilled in the art to which it relates from the following specification, claims and drawing.

In accordance with this invention there is provided an improved soldering tool of the hand grip or gun type which is designed to be fast heating so that the tip thereof is supplied with heating current substantially only during the soldering operations. The soldering tool disclosed herein is provided with a small stepdown transformer having a primary adapted to be supplied from the ordinary 110 volt circuit and having a secondary of such proportions that it will supply a high intensity current at very low voltage to the heating tip. The heating tip may consist of a copper wire of number 14 AWG, for example, or it may consist of copper-nickel alloy as disclosed in French Patent No. 838,748 issued December 16, 1938. This tip is connected to the secondary of the stepdown transformer through a co-axial conductor arrangement constructed to be well braced and of sufficient strength so that the necessary pressure may be applied to the soldering tip to perform the soldering operations efficiently.

Other features of this invention will be set forth in the following specification, claims and drawing. Referring to the drawing briefly:

Fig. 1 is a side view, partially in section and partially broken away, showing an embodiment of this invention;

2

Fig. 5 is a side view partially in section and partially broken away of another embodiment of this soldering tool;

Fig. 6 is a side view of the transformer of the tool shown in Fig. 5 before the ends of the secondary are formed into the co-axial tubular conductors;

Fig. 7 is a sectional view taken along the line 7—7 of Fig. 6;

Figs. 8, 9, 10 and 11 are views showing how the ends of the secondary of the stepdown transformers are tubulated;

Fig. 12 is a detail view of the strap of copper employed for winding the stepdown transformer secondary and for providing the material for the co-axial conductors;

Fig. 13 is a sectional view along the line 13—13 of Fig. 12;

Fig. 14 is a sectional view of a modified form of transformer employed in accordance with this invention;

Figure 1:
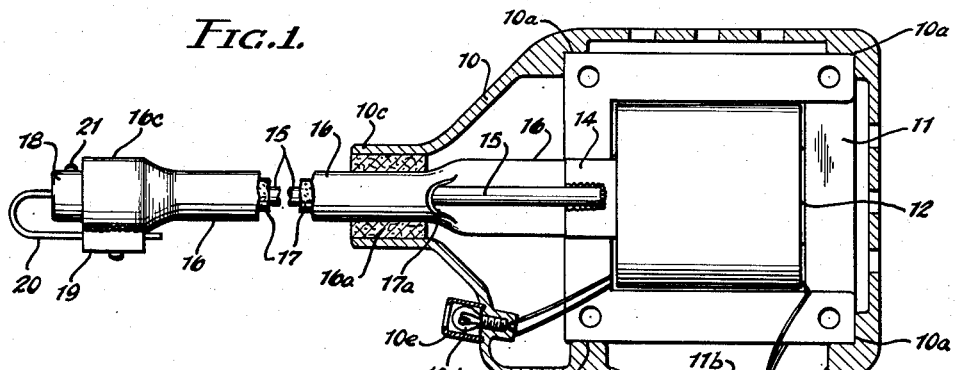
Figure 2:
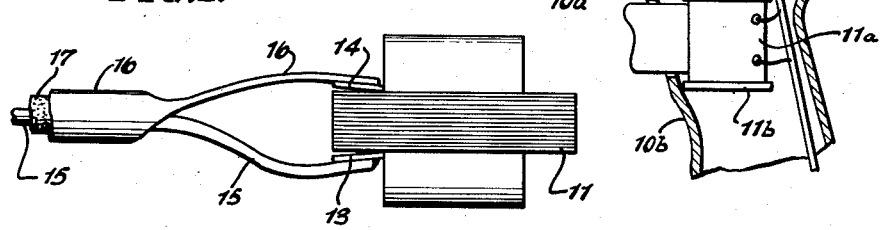
Fig. 2 is a top view of the stepdown transformer showing the manner in which the secondary of the transformer is connected to the co-axial current feeders.
Figure 3:
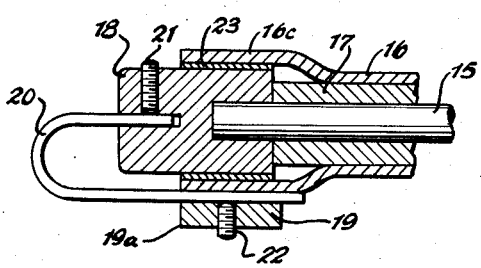
Fig. 3 is a sectional view of the tip end of the soldering tool shown in Fig. 1.
Figure 4:
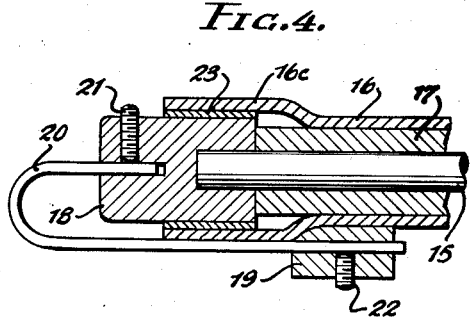
Fig. 4 is a slightly modified form of tip of the soldering tool.

Referring to the drawing in detail, there is shown in Fig. 1 a hand soldering tool having a casing 10 which may be made of plastic material or die cast material and inside of which is positioned a transformer 11, the corner portions of which are snugly engaged by the abutments 10a formed inside of the casting to hold the transformer stationary with respect to the casing. In the handle portion 10b of the tool is positioned an electric switch 11a that is held by the abutments 11b formed in the handle of the tool. The switch 11a is connected in series with the primary winding of the transformer and the 115 volt A. C. supply circuit. The secondary of the transformer 11 is made up of one or two turns of relatively heavy copper ribbon that is wound around the central leg 12 of the transformer and insulated therefrom. The primary winding of the transformer is wound over this copper ribbon secondary and is also insulated therefrom. An additional secondary winding or a tap on the primary winding is provided for energizing the small spot light 10d that is provided in a small shield 10e to throw a light on the work and tip. The ends of the secondary 13 and 14 are brought out of the side of the transformer and are connected to the heavy copper conductors 15 and 16 respectively. The copper conductor 16 consists of a heavy walled copper tube having an inside diameter slightly greater than the outside diameter of the conductor 15. The end of the tubular conductor 16 is flattened and attached by soldering to the end 14 of the transformer secondary and a hole 17a is formed into the tube 16 to permit the wire 15 to be drawn out from inside thereof and spaced therefrom. The wire 15 is spaced from the inside of the tube 16 by the insulation sleeve 17 which may be made of asbestos, mica, "mycalex," silicon rubber or any other suitable heat resistance material.

Before the wire 15 and the tube 16 are assembled as shown in Fig. 1, the fittings 18 and 19 that are used for the purpose of attaching the tip 20 to the tool, are brazed or hard soldered to the ends of the wire 15 and tube 16 respectively. The end 16c of the tube 16 may be slightly expanded or flared for the purpose of receiving the fitting 18 and the mica insulation sleeve 23. However, if the copper tube 16 is of sufficient inside diameter to receive the fitting 18 and the insulation sleeve 23 the flaring 16c may be eliminated. If the tube 16 is to be flared then the heat resisting supporting sleeve 16a fitting into the neck 10c of the casing, must be placed over the tube 16 prior to the flaring unless this sleeve 16a is split or made in two parts. This sleeve functions to brace the co-axial conductor arrangement and reduces the pressure that soldering operations may exert on the secondary terminals 13 and 14 through the co-axial conductor structure. Furthermore, this sleeve also insulates the neck 10c of the casing from heat that may be developed in the co-axial conductor arrangement.

The fittings 18 and 19 are provided with holes for receiving the end portions of the soldering tip 20. In the case of the fitting 19, this hole may be formed in such a way that the end portion of the soldering tip 20 is clamped against the outside of the tube 16. Furthermore, the front lip 19a of the fitting 19 may be made relatively sharp so that it may be employed for scraping corroded surfaces of metals to be soldered. Suitable set screws 21 and 22 are provided to the fittings 18 and 19 respectively, for the purpose of firmly fastening the tip 20 therein.

The form of this invention as shown in Fig. 5 also employs a casing 10 and a transformer 11 similar to that shown in Fig. 1. In this case, however, the ends of the secondary winding of the transformer 11 are brought out as relatively long strap-like extensions 30 and 31 as shown in Figs. 6 and 7. These secondary extensions are shaped into co-axial tubular conductors in a series of operations as shown in Figs. 8, 9, 10 and 11 so that the co-axial structures shown in Figs. 5 and 14 are produced. The conductor 30 which is to be the inside conductor of the co-axial arrangement is shaped first by placing this conductor into the jaws 32 of the shaping tool. These jaws may be as wide as the conductor is long so that substantially the whole length of the conductor projecting from the transformer 4 may be formed at once. As the jaws 32 of the forming tool are closed, the conductor 30 is bent into an arc as shown in Fig. 9. It may then be placed into a smaller forming tool 33 and compressed into a tube as shown in Fig. 10.

Before the conductor 30 is bent as shown in Figs. 8, 9 and 10, the sides thereof may be ground to provide a slight taper so that these sides will not grab when they are bent into opposing positions but will slide past each other to form the tube shown in Fig. 10. Furthermore, before the conductor 30 is shaped as shown in Figs. 8, 9 and 10, both this conductor and the conductor 31 may be coated with suitable insulating varnish such as silicon rubber or any other heat resisting varnish or enamel and the transformer together with these conductors 30 and 31 may be left to dry or may be baked or cured in a suitable oven. This coating of insulation is then bent with the conductor 30 and forms an insulating coating on the outside thereof to insulate this conductor from the conductor 31 which is provided with a similar coating and which is bent around the outside of the conductor 30 as shown in Fig. 11. The same tools are employed for bending the conductor 31 as are employed for bending the conductor 30. Since the conductor 30 is to be inside of the conductor 31 these conductors must be bent adjacent to the side of the transformer core and brought close to and parallel to each other during the final bending operations of the conductor 31. The co-axial arrangement of the conductors 30 and 31 spaced by the insulating varnish and shown in Fig. 5 is thus produced. This embodiment of the invention is also provided with the fittings 18 and 19 for holding the tip 20 at the working end thereof. The fitting 18 is brazed or hard soldered to the end of the inner conductor 30. However, in this case, since the conductor 30 is formed with a hole 30a therein, the fitting 18 may be provided with a stud 18a projecting into the hole 30a and this may be silver soldered therein. This may be done before the outer tube 31 is formed over the conductor 30 and also before varnish or enamel is applied to the conductors 30 and 31. The fitting 19 is hard soldered on the outside of the tube 31, and the seam in the tube 31 may also be soldered.

The secondary of the transformer 11 may be wound with a piece of copper ribbon 34 shown in Fig. 12. This portion 34 of the copper ribbon is looped around the central leg 12 of the transformer core to form one and a fraction or two and a fraction turns around this central leg. The copper ribbon is then given two right angle bends shown in Figs. 12 and 13 so as to bring the end portions 30 and 31 into line with the central leg 12 of the transformer and permit these end portions 30 and 31 to extend out of the transformer as previously described.

The transformers described in the preceding paragraphs are made up of laminated iron cores in which the laminations are stacked one on top of each other to build up the core of desired cross-section. In Fig. 14 there is illustrated a transformer made up of a wound core such as disclosed in Patents Nos. 1,857,215 and 1,902,491. The wound core 35 shown in Fig. 14 is provided with a primary 36 having a suitable number of turns for use with a 115 volt A. C. circuit. The secondary 37 consists of one loop of copper ribbon that is provided with a suitable varnish or enamel coating. This secondary 37 is also spaced from the primary by means of a suitable insulation strip 38 consisting of paper or cloth impregnated with "Bakelite." After the core 35 is suitably annealed and tightened as described in the patents mentioned above, the copper strip 37 is bent over the outside of the core 35 to hug the iron core as closely as possible in order to increase the efficiency of the transformer structure. The ends 30a and 31a of the secondary 37 are brought around to the side of the transformer and formed into a co-axial structure the same as the co-axial structure shown in Fig. 5 by employing the steps described in connection with Figs. 8, 9, 10 and 11. A suitable tip 20 is also attached to this co-axial structure by means of fittings 18 and 19.

Figure 15:
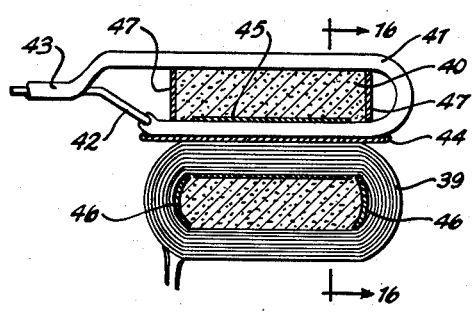
Fig. 15 is a sectional view of another modified form of transformer employed in accordance with this invention and Fig. 16 is a sectional view along the line 16—16 of Fig. 15.
Figure 16:
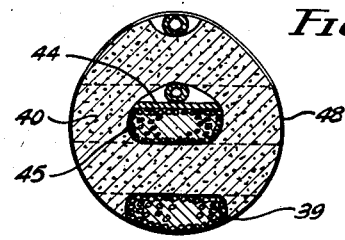

In Figs. 15 and 16 there is illustrated an embodiment of this invention employing a primary winding 39 having the same general configuration as the primary winding 36 shown in Fig. 14. These windings consist of a plurality of turns of insulated wire, the insulation preferably consisting of enamel. The core 40 consists of magnetic material such as powdered iron or magnetite held together by a suitable varnish or enamel. Before the core 40 is placed around the windings, the primary 39 is assembled with the secondary loop 41 with the strip of insulating material 44 therebetween and this assembly is held together by the tape 45 which is looped through these windings. Thereafter thin strips of insulating material 46 are placed inside of the winding 39 and the strips of insulation 47 are sprung into the secondary loop 41. The core 40 is then placed into the windings in a paste-like consistency. Thereafter the core and windings are wrapped up in a tape 48 and the whole is dried by baking. The short end of the secondary loop 41 is joined to the wire 42 that passes through a hole such as the hole 17a shown in Fig. 1 which is formed in the tubular member 43 formed integral with the loop 41. The wire 42 and the tube 43 form a co-axial structure such as are shown in Fig. 1 and this structure is provided with a soldering tip 20 and fittings 18 and 19 as illustrated in Fig. 1. The embodiment of this invention shown in Figs. 15 and 16 may obviously be provided with a secondary made of copper ribbon as shown in Fig. 14 together with the same type of tip construction as is illustrated in Fig. 5.

While the preferred embodiments of this invention have been described and illustrated in detail, it is not desired to limit this invention to the exact details set forth in the specification and drawing except in so far as those details are defined by the appended claims.

What I claim is:

1. A hand operated soldering tool comprising a stepdown transformer, a casing for said transformer, said casing having a hand grip, said transformer having a secondary winding of flat ribbon shaped material adapted to carry a heavy current at very low voltage, the ends of said secondary winding extending out of said casing, one of said ends being formed into a tubular conductor, the other of said ends being formed into a second tubular conductor passing through said first mentioned tubular conductor, means for insulating said tubular conductors from each other, said conductors comprising a co-axial conductor construction of substantially rigid form extending to the front of said case, and a soldering tip consisting of a wire of small cross-section compared to the cross-section of said conductors and means for connecting said soldering tip across the free end of said co-axial conductor construction to form a rapidly heating solder melting element.

2. A hand operated soldering tool comprising a stepdown transformer, a casing for said transformer, said casing having a hand grip, said transformer having a secondary winding of flat ribbon shaped material adapted to carry a heavy current at very low voltage, one end of said secondary winding being formed into a tubular member and extending out of said casing, a second conductor passing through said tubular member and insulated therefrom, said second conductor being connected to the other end of said secondary, said conductors comprising a co-axial conductor construction of substantially rigid form extending through an opening in said case to the front thereof, and a soldering tip consisting of a wire of small cross-section compared to the cross-section of said conductors and means for connecting said soldering tip across the free end of said co-axial conductor construction to form a rapidly heating solder melting element.

3. A hand operated soldering tool comprising a stepdown transformer, a casing for said transformer, said casing having a hand grip, said transformer having a low voltage secondary winding for developing a relatively large current at low voltage, a co-axial conductor construction formed out of the free ends of said secondary winding and projecting from said casing through an opening in the front thereof, a heating tip comprising a conductor having a cross-section equal to a fraction of the cross-section of the conductor of said secondary, and means for attaching said heating tip to the free ends of said co-axial conductor construction.

4. A hand operated soldering tool comprising a stepdown transformer, a casing for said transformer, said casing having a hand grip, said transformer having a low voltage secondary winding for developing a relatively large current at low voltage, a co-axial conductor construction comprising substantially concentric tubes formed out of the free ends of said secondary winding and projecting from said casing through an opening in the front thereof, a heating tip comprising a conductor having a cross-section equal to a fraction of a cross-section of the conductor of said secondary, and means for attaching said heating tip to the free ends of said co-axial conductor construction.

5. A hand operated soldering tool comprising a stepdown transformer, a casing for said transformer, said casing having a hand grip, said transformer having a low voltage secondary winding for developing a relatively large current at low voltage, said secondary winding being made up of a ribbon of copper having a width equal to several times its thickness, a co-axial conductor construction comprising substantially concentric tubes formed out of the free ends of said secondary winding and projecting from said casing through an opening in the front thereof, a heating tip having a cross-section equal to a fraction of a cross-section of the conductor of said secondary, and means for attaching said heating tip to the free ends of said co-axial conductor construction.

6. The method of manufacturing the co-axial soldering tip support of a rapidly heating soldering tool having a transformer with a low voltage secondary comprising the steps of rolling one end of the ribbon shaped transformer secondary conductor into a tubular member, coating said tubular member with heat resistant insulation, rolling the other end of the ribbon shaped transformer secondary over said insulation coating and said tubular member to be substantially co-axial therewith and rigidly attaching the solder melting conductor across the ends of said tubular members.

7. A hand operated soldering tool comprising a stepdown transformer, a casing for said transformer, said casing having a hand grip, said transformer having a secondary winding adapted to carry a heavy current at very low voltage, a tubular conductor projecting from said casing through an opening formed therein, said tubular conductor having one end thereof flattened and joined to one end of said secondary, said tubular conductor having a hole formed therethrough at a point inside of said casing remote from the point at which said tubular conductor is flattened, a second conductor passing through said hole into and through said tubular conductor and insulated therefrom, means for connecting said second conductor to the other end of said secondary, said conductors comprising a co-axial conductor construction of substantially rigid form extending to the front of said case, and a soldering tip consisting of a wire of small cross-section compared to the cross-section of said conductors and means for connecting said soldering tip across the free end of said co-axial conductor construction to form a rapidly heating solder melting element.

8. A hand operated soldering tool comprising a stepdown transformer, a casing for said transformer, said casing having a hand grip, said transformer having a secondary winding consisting of a tubular conductor adapted to carry a heavy current at a very low voltage, one end of said tubular conductor projecting from said casing through an opening formed therein, said tubular conductor having a hole formed therein at a point inside of said casing, a second conductor passing through said hole into said tubular conductor and insulated therefrom, said second conductor being connected to the other end of said tubular conductor, said second conductor and said tubular conductor comprising a co-axial conductor construction of substantially rigid form extending through the aforesaid opening in said case to the front thereof, and a soldering tip consisting of a wire of small cross-section compared to the cross-section of said conductors and means for connecting said soldering tip across the free end of said co-axial conductor construction of form a rapidly heating solder melting element.

9. A hand operated soldering tool comprising a stepdown transformer, a casing for said transformer, said casing having a hand grip, said transformer having a magnetic core of strip material closely wound into a coil having an axially extending hole therethrough, said transformer having a low voltage secondary winding for developing a relatively large current at low voltage, said secondary winding consisting of a loop of metallic ribbon extending across the outside of said core and also extending through said hole in said core, a co-axial conductor construction formed out of the free ends of the metallic ribbon of said secondary winding and projecting from said casing through an opening in the front thereof, a heating tip comprising a conductor having a cross-section equal to a fraction of the cross-section of the conductor of said secondary, and means for attaching said heating tip to the free ends of said co-axial conductor construction.

10. A hand operated soldering tool comprising a stepdown transformer, a casing for said transformer, said casing having a hand grip, said transformer having a low voltage secondary winding for developing a relatively large current at low voltage, a co-axial conductor construction, said co-axial conductor construction consisting of a pair of ribbon shaped conductors, one of which is rolled over the other, the inner conductor of said co-axial conductor construction being connected to one end of said secondary and the outer conductor of said co-axial conductor construction being connected to the other end of said secondary, said co-axial conductor construction projecting from said casing through an opening in the front thereof, an exposed heating tip for performing soldering operations, said heating tip comprising a conductor having a cross-section equal to a fraction of a cross-section of the conductor of said secondary, and means for attaching said heating tip to the free ends of said co-axial conductor construction.

11. A hand operated soldering tool comprising a stepdown transformer, a casing for said transformer, said casing having a hand grip, said transformer having a magnetic core of strip material closely wound into a coil having an axially extending hole therethrough, said transformer having a low voltage secondary winding for developing a relatively large current at low voltage, said secondary winding consisting of a loop of metallic ribbon extending across the outside of said core and also extending through said hole in said core, a co-axial conductor construction comprising substantially concentric tubes formed out of the free ends of the metallic ribbon of said secondary winding and projecting from said casing through an opening in the front thereof, a heating tip comprising a conductor having a cross-section equal to a fraction of the cross-section of the conductor of said secondary, and means for attaching said heating tip to the free ends of said co-axial conductor construction.

12. A hand operated soldering tool comprising a stepdown transformer, a casing for said transformer, said casing having a hand grip, said transformer having a magnetic core of strip material closely wound into a coil having an axially extending hole therethrough, said transformer having a low voltage secondary winding for developing a relatively large current at low voltage, said secondary winding being made up of a ribbon of copper having a width equal to several times its thickness, said secondary winding consisting of a loop formed of said ribbon extending across the outside of said core and also extending through said hole in said core, a co-axial conductor construction comprising substantially concentric tubes formed out of the free ends of said secondary winding and projecting from said casing through an opening in the front thereof, a heating tip having a cross-section equal to a fraction of the cross-section of the conductor of said secondary, and means for attaching said heating tip to the free ends of said co-axial conductor construction.

13. The method of manufacturing the co-axial soldering tip support of a rapidly heating soldering tool having a transformer with a low voltage secondary of ribbon shaped conductor comprising the steps of providing the secondary of the transformer with a pair of free end portions extending therefrom for the purpose of supporting the solder melting tip, rolling one of said free end portions of the ribbon shaped transformer secondary conductor into a tubular member, coating said tubular member with heat resistant insulation, rolling the other of said free end portions of the ribbon shaped transformer secondary over said insulation coating and over said tubular member to form a tubular member substantially coaxial with said first mentioned tubular member and rigidly attaching the solder melting conductor across the ends of said tubular members.

BENJAMIN J. CHROMY.

References Cited in the file of this patent

UNITED STATES PATENTS

| Number | Name | Date |
|---|---|---|
| 958,753 | Meyer | May 24, 1910 |
| 1,684,143 | Pieper et al. | Sept. 11, 1928 |
| 1,857,215 | Ruder | May 10, 1932 |
| 1,897,604 | Clemons | Feb. 14, 1933 |
| 2,372,645 | Barmack | Apr. 3, 1945 |
| 2,405,866 | Weller | Aug. 13, 1946 |
| 2,560,552 | Caliri | July 17, 1951 |
| 2,570,762 | Caliri | Oct. 9, 1951 |

FOREIGN PATENTS

| Number | Country | Date |
|---|---|---|
| 389,309 | Germany | Feb. 7, 1924 |
| 628,968 | Great Britain | Sept. 8, 1949 |
| 787,065 | France | Sept. 16, 1935 |
| 838,748 | France | Mar. 14, 1939 |